Dec. 18, 1956  S. G. WASHBURN  2,774,153
SNOW PLOW

Filed May 20, 1953  2 Sheets-Sheet 1

INVENTOR.
SELDEN G. WASHBURN
BY
Richard P. Cardew
AGENT

United States Patent Office 2,774,153
Patented Dec. 18, 1956

2,774,153

SNOW PLOW

Selden G. Washburn, Goodwin, S. Dak.

Application May 20, 1953, Serial No. 356,239

2 Claims. (Cl. 37—43)

This invention relates to snow plows, and has special reference to such devices of the so-called "rotary" type.

It is well known that there are many devices made and in use for plowing snow, however, everyone who is familiar with the problems of snow plowing admits that there is still a great need for improvements in snow plows to enable them to do their plowing more efficiently. For example, it is well known that rotary snow plows in common use are not able to plow snow of any great depth with any degree of efficiency. When deep snow is encountered, the plows will usually become stalled and spin their drive wheels even with chains on. With my invention, it is possible to plow through exceptionally deep snow without using chains for traction and without fear of becoming stalled.

Also, it is well known that common rotary snow plows require much more power for operating than seems necessary: the horsepower required to do a given amount of work is much too high. It is also well known that common snow plowing devices are not able to clear as many miles of road per day as is necessary for satisfactory recovery of a community, county, or other area from a snow storm of any size. Many towns are isolated for several days because of the inability of snow removal equipment to do their work.

Obviously, it is impossible for cities, counties and States to have a great deal of expensive equipment standing in reserve for such an occasion as a severe snow storm, for they must use their equipment as often as possible and in other ways besides snow plowing in order to get proper value for their money spent in the purchase of equipment. For this reason, snow plows are usually so made as to be attached to a conventional vehicle such as truck, tractors, or the like, and to receive their operating power from the vehicle, thereby reducing the amount of money invested in special equipment such as snow plows. However, even when all available vehicles are equipped with snow plows, they cannot traverse the many miles of snow covered roads which must be plowed in order to restore normal life in their area because of the inefficiencies in common snow plows.

It is, therefore, one of my principal objects to provide an improvement in so-called "rotary" snow plows which, will be operable to clear very deep snow without stalling or spinning its drive wheels and thereby make it possible for them to cover more territory and handle more snow in a given period of time than is possible to open roads to traffic much more quickly with the same amount of equipment as was previously used.

Another object is to provide a rotary snow plow attachment or improvement which will make it possible to move the same amount of snow with less power than is required in conventional plows of this type.

Another object is to provide an attachment for rotary snow plows which is relatively simple and inexpensive to manufacture, and which is driven from the same source as, and axially of, the rotor of the plow.

A more specific object is to provide a device having the above attributes which may be mounted on conventional rotary snow plows to improve their operation.

Another object is to provide a rotary snow plow with an upper guide wall which is pivoted on a horizontal axis to facilitate the plowing of deep snow, whenever it is encountered, yet will not interfere with the plow operator's view when not plowing deep snow, the guide wall being so designed as to be automatic in its operation.

These and other obejcts and advantages of my invention will become more apparent as the description proceeds.

In the accompanying drawings forming a part of this application:

Figure 1:
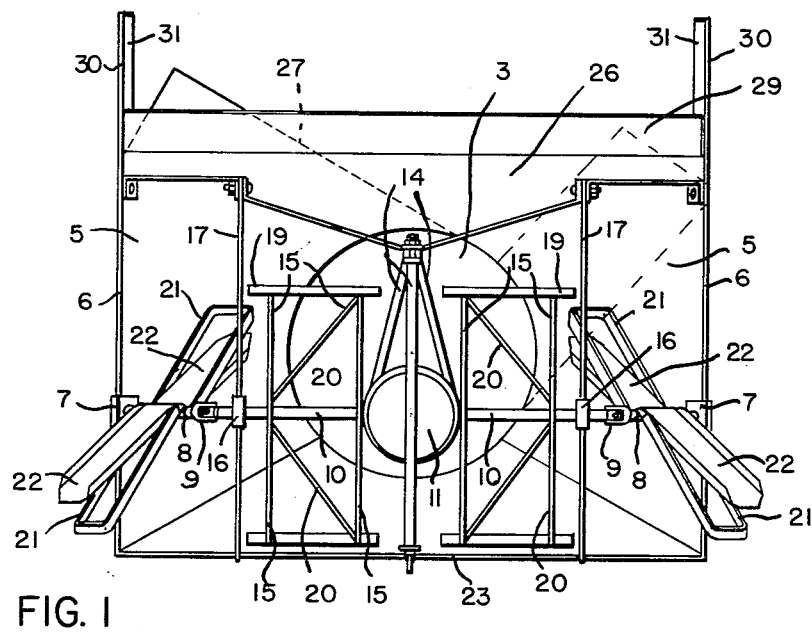
Figure 1 is a front elevational view of my invention.
Figure 2:
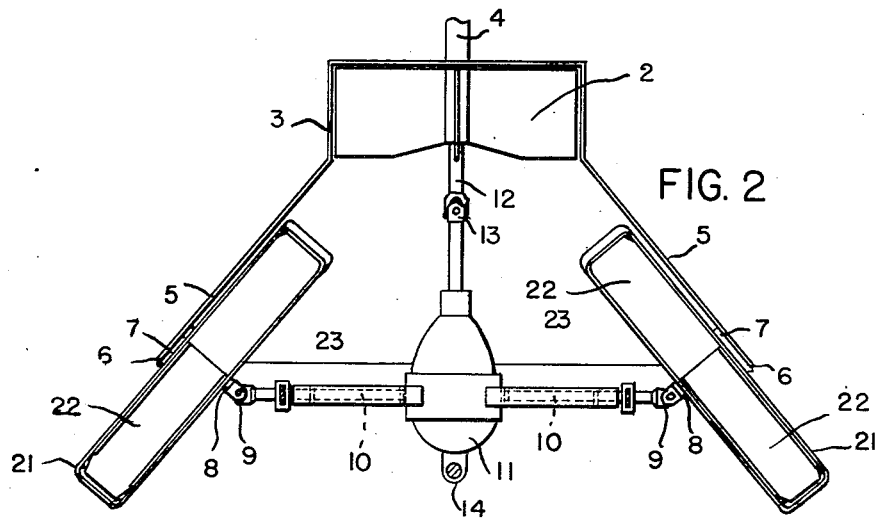
Figure 2 is a top view of Figure 1, with parts broken away to expose structural parts and features.

In the drawing, the reference numeral 1 indicates the frame or brackets by means of which my device may be attached to a vehicle, the mounting frame and brackets being on the rear or trailing portion of the plow, of course.

The numeral 2 indicates the vertically disposed rotor or snow-throwing fan, and 3 indicates the fan or rotor housing, the frame 1 being attached to the housing 3, of course. The numeral 4 indicates the substantially horizontally disposed drive shaft for the fan 2, the drive shaft being connectable with any suitable source of power, not shown, such as the power-take-off of a vehicle. All of this structure is conventional, of course.

In my invention, I have provided vertically disposed side walls or wings 5—5 on each side of the fan housing 3, the wings 5—5 being oppositely disposed in angular relation to the direction of travel of the plow so as to converge from their outer or forward edges 6—6 toward the fan so as to direct snow toward and into the fan.

The side walls extend a substantial distance ahead of the fan 2, as can be seen from the drawings, and each provides a place to mount a bearing block 7, one bearing 7 being carried on each side wall in vertically spaced relation to the ground. Each bearing 7 rotatably carries one end of a substantially horizontally disposed end shaft 8, one shaft 8 being located on each side of the device, and both shafts being disposed in angular relation to the direction of travel of the plow, the inner ends thereof being carried forwardly of the bearings which support the rear ends of the shafts.

The inner end of each shaft has a universal joint 9 mounted thereon, and the universal joint has its opposite end connected with a central shaft 10 which extends transversely of the plow or normal to the direction of travel of the plow. Each central shaft is connected to gearing, not shown, in a common gear box 11, the central shafts being connected to opposite sides of the gear box and being substantially in alinement with each other.

A drive shaft 12 extends from the gear box 11 rearwardly and towards the fan 2, the drive having a universal joint 13 mounted therein as shown, and the drive for the gear box continuing through the fan drive to receive its power from the vehicle which is pushing the plow. Suitable bracing and brackets 14—14 are provided to support the gear box and the ends of the shaft 10, of course.

As is deemed apparent the rotation of the drive shaft 12, will cause the simultaneous rotation of the shafts 10, which in turn will cause the rotation of the shafts 8, through the universal joint 9.

Figure 3:
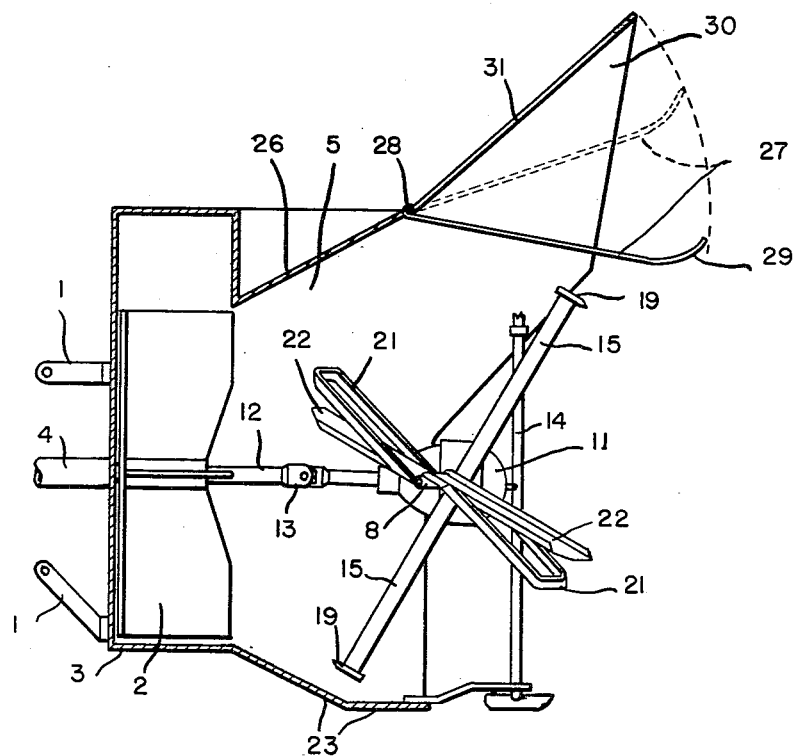
Figure 3 is a vertical sectional view of the device shown in Figures 1 and 2.

On each of the shafts 10, a pair of spaced diametrically extending arms 15—15 are mounted one adjacent the gear box 11, and the other adjacent the bearings 16, which support the outer ends of the shafts 10, on the vertical supports 17. Intermediate the outer ends of each of the arms 15—15 is carried a cutter blade 19, one cutter being carried on the outer ends of each pair of arms 15 as shown. The cutters extend in substantially parallel relation to the shafts 10. The cutters preferably comprise a flat strip of metal mounted with its broad face tangentially disposed relative to the circle which would be scribed by the rotation of the shafts 10 and cutters, whereby the thin edge of the strip of metal forming the cutters acts as a knife blade to cut into snow engaged thereby. The cutters 19 and shafts 10 are preferably located as close to the fan 7 as possible, to make the plow as short as possible and to eliminate dead space between cutters and fan in which snow might pack, see Fig. 3.

Suitable bracing 20, is provided to rigidify the cutters assembly on each side of the gear box 11, as shown.

On each of the shafts 8, a combination cutter and impeller unit is mounted. Each of these units comprise a pair of U-shaped frames 21—21, fixed to the shafts 8 to rotate therewith, the frames extending radially from the shaft on opposite sides thereof. The U-shaped cutters have their thin edge facing the direction of rotation in the same manner that the cutters 19, have their thin edge disposed towards the direction of rotation to provide the most efficient cutting action. Mounted with the U-shaped cutter frames 21 and on the shafts 8, are a pair of impeller blades 22—22, the impeller blades being of less length than the cutters and so mounted as to trail the U-shaped cutters by a few degrees during the rotation of the shafts 8, or in other words each of the U-shaped cutter frames 21 has an impeller 22 mounted in association therewith, whereby an acute angle is formed between the U-shaped cutters and its respective impeller, each of the cutters 21 and impeller 22 being mounted to extend substantially, radially from the shafts 8 as shown.

It may be readily seen that the rotation of the drive shaft 12, will cause the rotation of the cutters 19, 21, and the impellers 22, the cutters 19 being rotated in such a manner that they extend substantially normal to the direction of travel of the plow, whereby they will cut into snow and disintegrate same into smallest possible particles, for convenient handling by the fan as will become apparent.

It will also be noted that the cutters 21 and impellers 22 rotate in angular relation to the direction of travel of the plow and also in angular relation to the rotation of the cutters 19, whereby the cutters 21 and impellers 22 will break up snow extending even beyond the side walls 5 and deliver it into the fan.

In operation the plow is connected to a vehicle so that the fan 2 and the drive shaft 12, may be rotated from the power take off or some other suitable driving connection on the vehicle, such as a separate engine mounted on the vehicle, the plow being so connected as to be pushed forwardly with the cutters leading the fan, of course.

With the power applied and the cutters and impellers rotated as well as the fan 2 being rotated, the plow may be moved into snow of relatively great depths and the cutters 19, 21, and impellers 22, will cause the snow to be broken up.

The cutters and impellers are rotated at about one-fourth the speed of the fan 2 in my plow. The snow is separated into small lumps or chunks which are easily handled by the fan and may be thrown farther than finely pulverized snow could be. The snow after being divided into small lumps and chunks is directed into the fan 2 by the impellers and cutters and by the bottom wall 23 as the vehicle moves forwardly. Because of the breaking up of the snow, the fan 2 can more readily and efficiently handle the blowing of the snow out of the discharge openings 24 or 25, whichever discharge is being used.

I have found that with my cutter attachment as above described mounted in combination with the fan for a rotary snow plow, I can plow deep snow easily without stalling, and that I can plow materially faster, throw snow farther and use less power, than is possible with the conventional plow. I can also plow a wider path than is possible with a conventional plow not equipped with my cutters and impellers as above described. Because I can plow relatively deep snow with my device I have provided a fixed and upwardly inclined upper wall 26 which extends over the fan 2 and a portion of the cutter-impeller mechanism. To this upper wall 26, I have pivotally mounted an extension 27, the pivotal connection being indicated at 28. The outer end of the extension of the upper wall is arcuately shaped as at 29. The cutter portion, or extension, of the upper wall normally lies in a position depending from the pivotal connection 28 as shown in the accompanying drawing. However, the arcuate shoe portion 29 of the wall 27, will engage deep banks of snow as the plow moves forwardly because the pivotal wall 27, will be raised to permit the deep snow to enter the plow housing being engaged by the cutters. The cutters will undermine the snow and it will fall into the plow housing to be thrown by the fan in a conventional manner. The side walls 5 have an angular extension 30, to enclose the area covered by the pivotal wall 27, when it is in raised position. A flange 31 may be provided on the extension 30 of the side walls to provide a stop to limit the upward movement of the wall 27, whereby when a maximum depth of snow is reached the wall 27 is stopped from further pivotal movement and it will force snow down into the cutters as the plow moves forwardly.

Snow which is of such depths as to cause the wall 27 to be raised, is not encountered very frequently, of course, during normal plowing operations, therefore, the pivotal wall 27 provides the capacity for my plow to handle these deep drifts when they are encountered and yet permits the minimum heights of the plow housing so that the driver of the vehicle pushing the plow will have the maximum visibility during his normal operation of the plow.

From the above it is deemed apparent that my improved cutter and impeller attachment to be used in comparison with a substantially conventional rotary fan type plow will improve their operation materially and permit the clearing of larger areas in a given period of time with a given amount of equipment, thereby making it possible to restore normal community life much quicker after snow storms.

It is also deemed apparent that the pre-cutting up or breaking up of the snow by my cutters will clear the path for the same type of blower most conveniently and efficiently for the snow is broken and loosened right down to the closest possible level to the road surface by the cutters, the rotation of the cutters being such as to engage and act on substantially all of the snow before it reaches the fan. The cutters and impellers also help to move the snow rearwardly and because of their direction of rotation they do not slow down the forward movement of the plow but rather tend to pull the plow into the snow.

The side cutters and impellers greatly facilitate the movement of larger quantities of snow from the sides of the road into the fan, for as may be seen in the drawings the side cutters and impellers cover an area extending considerably beyond the normal span which a common rotary plow is expected to handle.

I have found that when using my plow as above equipped without the cutters and impellers rotating, it is very difficult to handle even very small amounts of snow and is practically impossible to handle snow which is even just a foot deep. With the cutters and impellers rotating I have been able to plow snow which exceeds the upper limits of the cutter-impeller combination more than a foot, this being the deepest snow encountered thus far with my plow.

Having thus described my invention, what I claim is:
1. In combination with a snow plow of the rotary type having a housing and a fan disposed in said housing substantially normal to the direction of travel of the plow to move snow upwardly and away from the road traversed by the plow, a rotatable shaft carried transversely of said housing and in forwardly spaced position relative to said fan, a plurality of arms extending radially from said shaft, a plurality of cutters carried by said arms, said cutters being disposed in spaced substantially parallel relation to said shaft, said arms being of such length and said shaft being so located that said cutters engage and cut snow lying forwardly of said fan and in close proximity to the ground over which they travel as they rotate with said shaft, the axis of rotation of said cutters being normal to the axis of rotation of said fan, said cutters serving to pre-cut and pulverize snow before it reaches said fan to facilitate the operation of the latter, a pair of side shafts rotatably carried in said housing in angular relation to said central shaft, means connecting one end of each of said side shafts to the adjacent end of said central shaft to rotate said side shafts from said central shaft, and a side cutter carried by each of said side shafts to rotate therewith and cut snow lying laterally of said cutters, said side cutters each comprising a substantially U-shaped blade carried by and extending substantially radially from said side shafts, and a radially extending impeller carried on said side shafts and in rearwardly spaced relation to said blades to move snow cut by said blades into said fan.

2. In combination with a snow plow of the rotary type having housing and a fan disposed in said housing substantially normal to the direction of travel of the plow to move snow upwardly and away from the road traversed by the plow, a central rotatable shaft carried transversely of said housing and in forwardly spaced position relative to said fan, a plurality of pairs of arms extending radially from said shaft, a plurality of cutters, one cutter being carried by each pair of said arms, said cutters being disposed in spaced substantially parallel relation to said shaft, the axis of rotation of said cutters being normal to the axis of rotation of said fan, said cutters serving to pre-cut and pulverize snow lying in front of said fan before it reaches said fan to facilitate the operation of the latter, a pair of side shafts rotatably carried in said housing, means connecting one end of each of said side shafts to the adjacent end of said central shaft to be rotated from said central shaft, and a side cutter carried by each of said side shafts, said side cutters each comprising a substantially U-shaped blade carried by and extending substantially radially from said side shafts, and a paddle member of a size and shape substantially the same as the area of said U-shaped cutter, said paddle member being mounted on said side shafts to extend radially therefrom intermediate the open area of said U-shaped cutter and being arranged to travel behind said side cutters several degrees during the rotation of said cutters, the axis of rotation of said side shafts, side cutters and paddles being in angular relation to the axis of rotation of said central shaft and said fan.

References Cited in the file of this patent
UNITED STATES PATENTS

| | | |
|---|---|---|
| 1,353,142 | Bohen | Sept. 21, 1920 |
| 1,407,895 | Smith | Feb. 28, 1922 |
| 1,673,457 | Jensen | June 12, 1928 |
| 1,701,767 | Barry | Feb. 12, 1929 |
| 1,870,591 | Saxon | Aug. 9, 1932 |
| 2,093,758 | Hansen | Sept. 21, 1937 |
| 2,151,491 | Washburn | Mar. 21, 1939 |
| 2,168,866 | Gehl | Aug. 8, 1939 |
| 2,246,015 | Sims | June 17, 1941 |
| 2,369,293 | Gotzlinger | Feb. 13, 1945 |